United States Patent [19]

Blau

[11] Patent Number: 5,191,501

[45] Date of Patent: Mar. 2, 1993

[54] FAST LAMP CURRENT LIMITING APPARATUS AND METHOD

[75] Inventor: David A. Blau, Cupertino, Calif.

[73] Assignee: Translite, Ltd., Redwood City, Calif.

[21] Appl. No.: 518,922

[22] Filed: May 4, 1990

[51] Int. Cl.$^5$ .............................. H05B 39/02
[52] U.S. Cl. ................................ 361/95; 361/87; 361/101
[58] Field of Search .............. 315/100, 205, 208, 219, 315/238, 276, 283, 291, 311; 361/93, 94, 95, 96, 89, 83, 59, 91, 95; 323/284, 285, 908; 363/49

[56] References Cited

U.S. PATENT DOCUMENTS

| | | | |
|---|---|---|---|
| 4,414,598 | 11/1983 | Nowell | 361/18 |
| 4,417,183 | 11/1983 | Popard et al. | 315/291 |
| 4,466,071 | 8/1984 | Russell, Jr. | 364/492 |
| 4,634,932 | 1/1987 | Nilssen | 315/119 |
| 4,849,683 | 7/1989 | Flolio | 323/284 |
| 4,853,820 | 8/1989 | Ham, Jr. et al. | 361/59 |

Primary Examiner—A. D. Pellinen
Assistant Examiner—S. Jackson
Attorney, Agent, or Firm—Thomas E. Schatzel

[57] ABSTRACT

A sensitive and fast low voltage lamp system controller to provide safe operation of "bare wire" systems that are particularly attractive for use in exhibition and tradeshow booth lighting. The high sensitivity is achieved by emphasizing high frequency noise present during shorts and by proportionately limiting the instantaneous current that tracks the line AC voltage waveform; fast response is provided by a power FET coupled to a bridge rectifier in series with the load and both then in series with a protection relay.

20 Claims, 4 Drawing Sheets

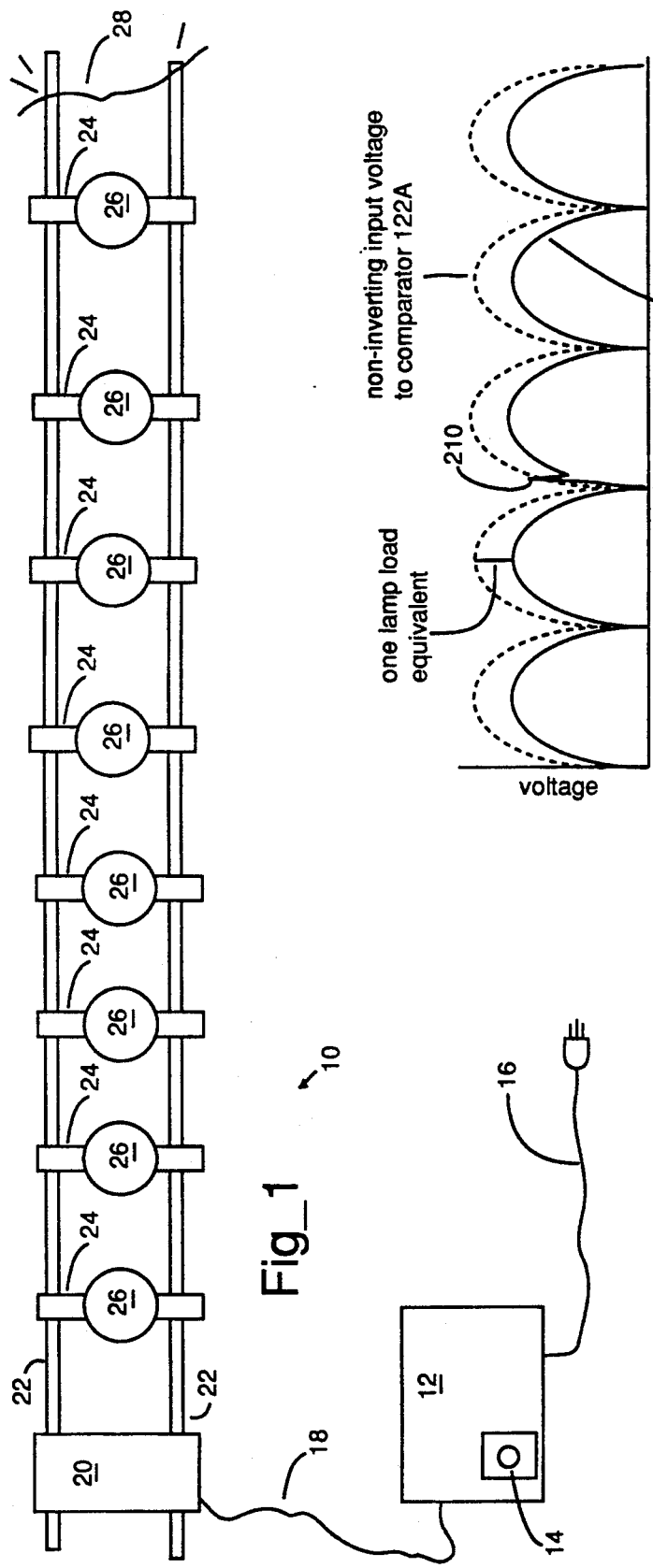

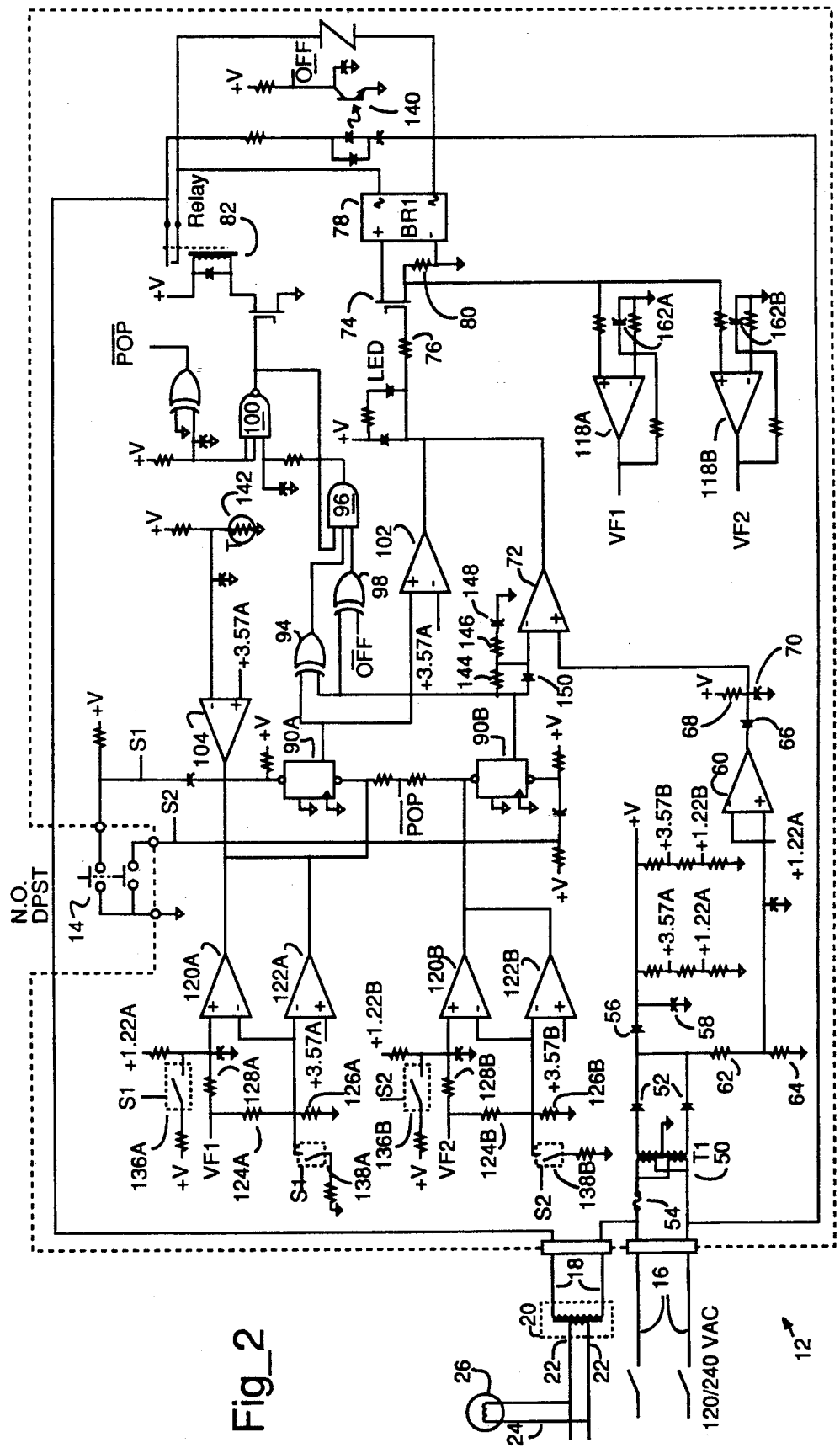
Fig_2

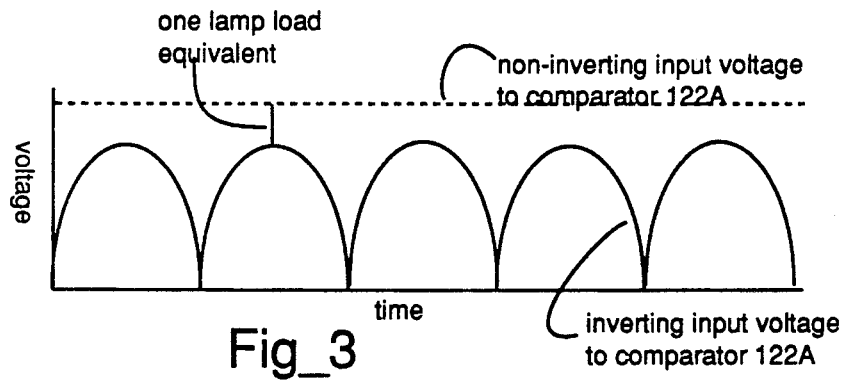
Fig_3
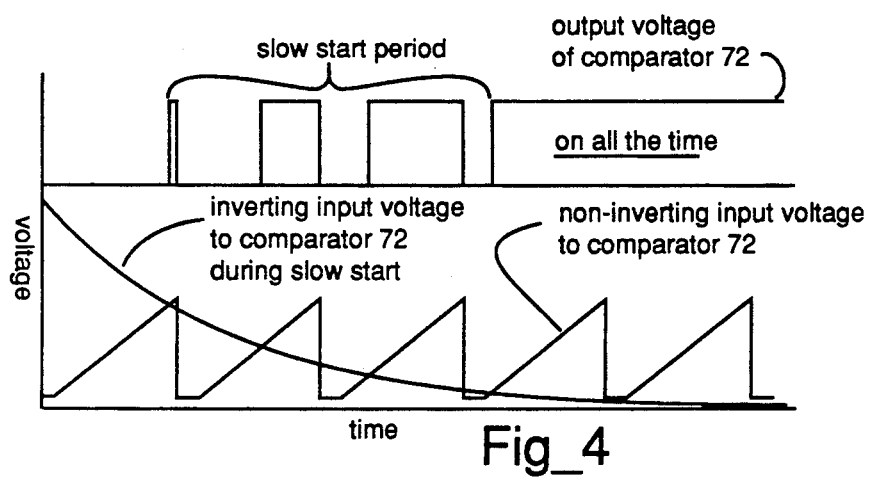
Fig_4
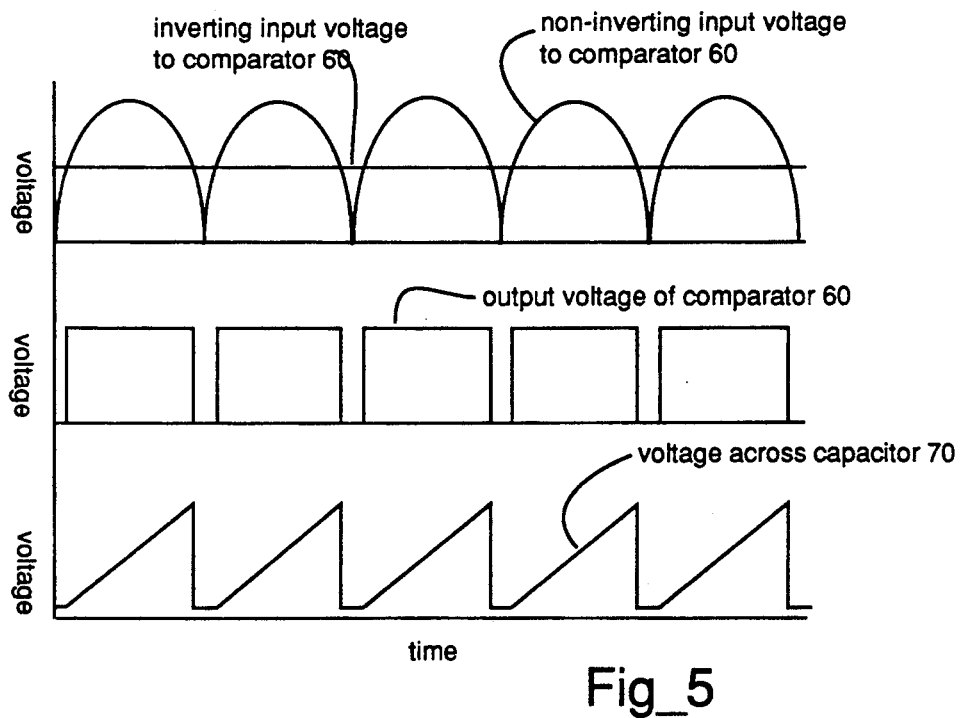
Fig_5

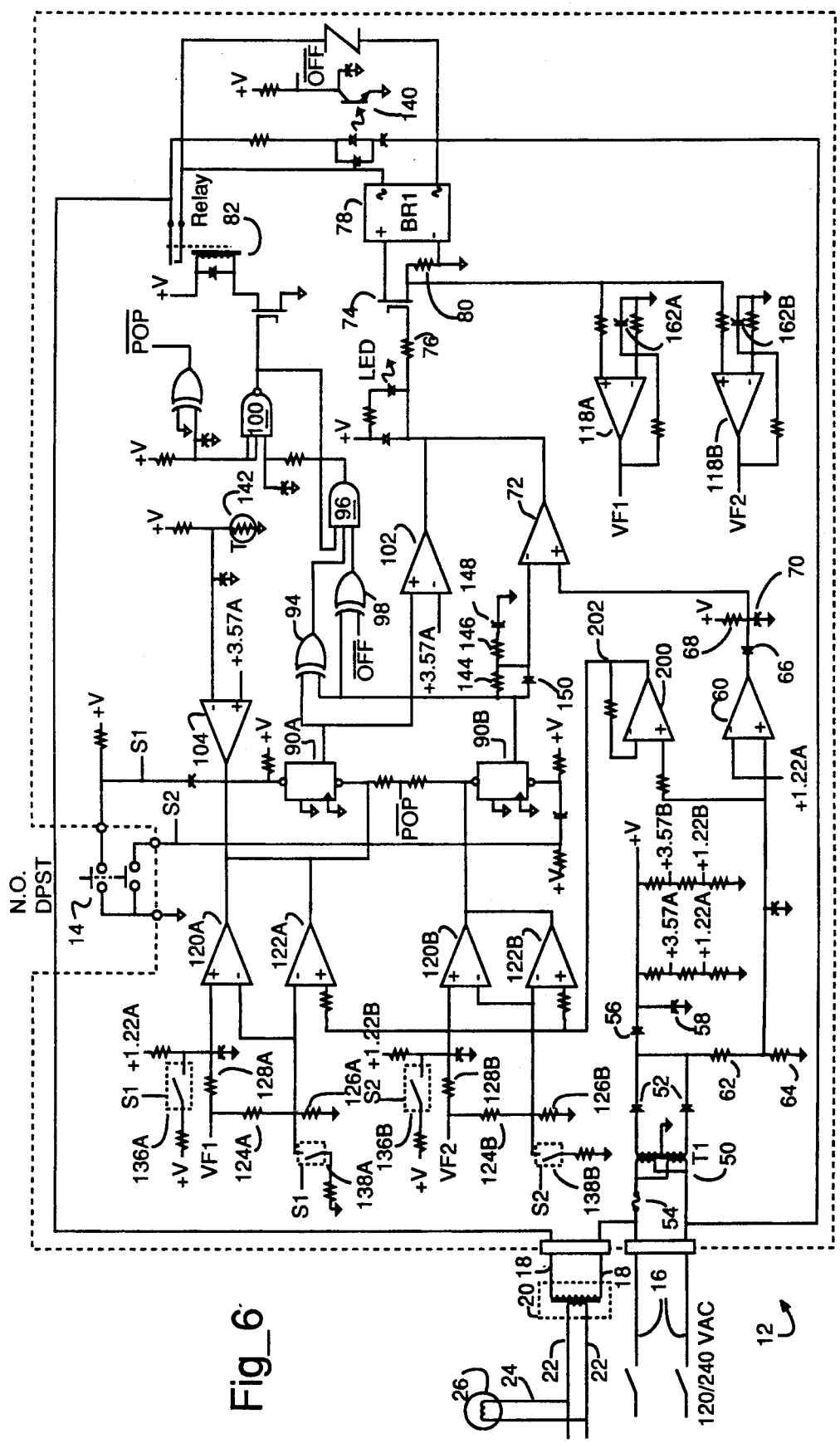
Fig_6

FAST LAMP CURRENT LIMITING APPARATUS AND METHOD

BACKGROUND OF THE INVENTION

1. Field of the Invention

The invention relates generally to lighting systems and specifically to low voltage "bare wire" quartz halogen technology; particularly in retail lighting display systems and portable, exhibition lighting packages.

2. Description of the Prior Art

Generally, the lower the operating voltage of a lamp is, the smaller a filament that can be used. The small quartz halogen lamp filament runs at a much higher temperature than a conventional tungsten filament lamp, causing a much, whiter light to be emitted. This, in turn, gives a greatly improved color rendition, which is an obvious advantage when color balance is important. The smaller, point-of-light source also offers much more control over the reflection and focusing of the light beams. And, both luminous flux and color temperature of the halogen lamp remain constant throughout its life because it will not "blacken."

The total heat transmitted in a low voltage lamp is less, overall, than conventional systems because of greater lumens per watt efficiency. Typical lamps have dichroic coatings on multi-faceted reflectors to ensure at least 60% of the infra-red rays (really heat) are transmitted through the back of the lamp. The low voltage halogen lamp is particularly appropriate for displays which are sensitive to heat.

The higher performing, low voltage halogen lamp represents an opportunity for widespread energy savings. A 12V, 50W low voltage halogen lamp produces the same lamp output as a 150W, 120 VAC lamp. A savings as large as 60% in energy costs is possible by simple replacement of conventional lamps with low voltage halogen lamps.

"Bare wire" conductors are easy to install, route, and dismantle. Because bare wire does not have to be fixed into a ceiling, the effective ceiling of the lamp can be lowered and thus save on lighting wasted space. A flexible lighting system useful for individual exhibits is disclosed by Boekholt in U.S. Pat. No. 4,652,068 ('068). Bare wire cables can span structures, instead of being fixed to them, and fittings can be suspended anywhere on the cable. The freedom of positioning such systems is described by Lettenmaye in West German Patent DE 3709641 and European Patent Office EP 0283800. A bare wire system gains a "portable" nature because the cables are inexpensive and practically disposable. A portable low voltage track lighting system is described by Sillett in United Kingdom Patent UK 2185863.

Low voltage halogen lamp systems offer little shock hazard since the voltages employed are so low. But in the case of a 500W system using 12V, the current can be as high as 42 amps RMS, 60 amps peak. These high currents give rise to a risk of fire or burning, since poor contacts and other resistances in the wires can produce much more heat than would be expected in conventional systems.

Bare wire lighting systems were shown at the Sept., 1989, Frankfurt 'Messe' show by exhibitors: Anta, AML, J.Bruck, and Lightline. The inventor observed that none had UL approval and the systems displayed were unlikely to gain such approval in their present forms because the fixtures were not guarded and there was not adequate short circuit protection.

Commercial necessities in the lamp systems industry require that Underwriter Laboratories (UL) approval be obtained for electrical products. City electrical inspectors are unlikely to accept non-UL devices in exhibition halls, and major retailers, generally will not accept non-UL inventory for their shelves. And, product liability insurance is virtually impossible to obtain without UL approval.

The nearest identifiable prior art categories to the present invention are UL-153 for portable electric lamps, and UL-1574, for track lighting systems. Neither of these categories specifically addresses the miniature dichroic lamp or exposed low voltage wires. However, the requirements of UL-1574 and parts of UL-991 were found by UL to be the correct standard to be applied. Two principal concerns for safety in any UL approval are, (1) over-current protection in the event of a short circuit, and (2) thermal problems with the high lamp operating temperatures.

The thermal problems are overcome by appropriate housings for the lamps. The present invention discloses a structure and method for providing over-current protection.

A major concern of safety engineers with regard to bare wire, or bare busing, is the accidental shorting of the two conductors with one another. Very thin and insubstantial shorts will tend to vaporize, while heavy and thick materials will easily conduct so much current that ordinary circuit breakers will shut off the power before the object can heat up much, but not usually before considerable arcing and sparking has taken place. The sparks created by a heavy short can start fires and heavy shorts can also become welded to the wire/cable.

The greatest danger in the heating of a short is in a medium weight and resistivity object coming into contact with the bare wires such that only modest over-currents are produced. Such objects will heat up to dangerous temperatures and can cause serious burns. Jewelry in particular is of concern. Such items as rings, bracelets, and necklaces can come into contact with bare wires. Since jewelry is worn about the body, a superheated piece of metal jewelry cannot be taken off quickly enough to avoid serious injury.

A circuit interruption device that is more sensitive and that responds much faster than conventional circuit breakers or fuses is needed in bare wire systems. Delay times on the order of the length of time a fuse's metal needs to vaporize, or a circuit breaker needs to trip can be enough time to substantially heat up a shorting object; and are therefore wholly unacceptable. Low voltage quartz halogen track lamp systems, in particular, are hard to fuse because a variable number of lamps may be placed on a track and the lamps draw much more current when starting up than they do during normal operation; the temptation in those situations is to over-fuse by some multiple, usually three or four to one—which would make the shorting hazards more acute.

The prior art has recognized the need to compensate for the higher currents that normally occur during lamp ignition start-up that mimic short circuits. Automatic compensation is provided in the start-up circuits described by Wisbey in U.S. Pat. No. 4,206,385 ('385). Also included is a circuit to interrupt the power supply to the ballast in the event that no current is flowing through the lamp, once the system has been energized.

Load sensing for unloaded or improperly loaded conditions is conventional and represented in U.S. Pat. No. 4,010,342 by Austin ('342). Varying the sensitivity of the load sensing circuit according to the power operating level of the inverter is also included in Austin ('342). Such load sensing can also include average load sensing means for providing a shutdown signal in response to the average value of the output current exceeding a predetermined maximum average output value, as in Gilliland, U.S. Pat. No. 4,785,149 ('149) and peak and average current sensing in Gilliland, United States Patent 4,716,274 ('274).

A high frequency, 30 KHz, "low-voltage" 30V RMS, fluorescent lighting system is disclosed in Nilssen, U.S. Pat. No. 4,634,932 ('932). An electronic means for preventing the power supply current from exceeding a predetermined relatively modest magnitude and a pair of conductor wires adapted to permit a number of lighting units is included in Nilssen ('932).

SUMMARY OF THE PRESENT INVENTION

It is therefore an object of the present invention to provide a system and method to enable the safe operation of bare wire lighting systems.

It is a further object to provide a system that meets UL approval and UL list criteria.

It is a further object to provide a system providing for fast over-current detection.

It is a further object to provide a system for providing for fast over-current interruption.

It is a further object to provide a system that is flexible and easily portable.

Briefly, a preferred embodiment of the present invention includes: a transformer with integral control system; two bare wire cables 80' long, consisting of 1000+ strand, 40 gauge copper wiring; eight 50W tungsten halogen lamps with dichroic reflectors; and a carrying case.

An advantage of the system and method of the present invention is that it is safe to operate, especially in tradeshow and exhibition lighting situations.

Another advantage of the system and method of the present invention is it is cost effective compared to conventional systems.

Another advantage of the system and method of the present invention is that it enables safety certification, by national testing laboratories, of lighting systems that employ it.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a schematic diagram of a low voltage lighting system of the present invention;

FIG. 2 is a schematic diagram of an exemplary circuit the controller included in FIG. 1;

FIG. 3 is a waveform graph for the inputs to comparator 122A of the circuit in FIG. 2;

FIG. 4 is a graph detailing the generation of slow start pulses by comparator 102 of the circuit in FIG. 2;

FIG. 5 is a graph detailing the waveforms present in the circuitry of comparator 60 which is part of the circuit in in FIG. 2;

FIG. 6 is a schematic diagram of a second embodiment of the present invention and details the controller included in FIG. 1; and FIG. 7 is a graph showing the waveforms present inputs to comparator 122A in FIG. 6.

DETAILED DESCRIPTION OF THE PREFERRED EMBODIMENTS

Referring now to FIG. 1, a low voltage halogen lamp system, referred to by the general reference character 10, includes a lamp over-current controller 12 having an on/off pushbutton 14, an AC line cord 16, a power cord 18, a stepdown transformer 20, a pair of cables 22, a plurality of fittings 24, and a plurality of lamps 26.

The fittings 24 and lamps 26 are positioned anywhere along the cables 22 and are powered by low voltage coming from stepdown transformer 20. The load seen by transformer 20 is reflected back to its primary winding and controller 12. Pushbutton 14 will cause controller 12 to alternately energize and de-energize. Any shorts 28 will be sensed by controller 12 and power to transformer 20 will be interrupted.

Two over-current conditions are defined, (1) if the peak primary current of transformer 20 exceeds 7.5A (5.3A RMS), (2) if the primary current of transformer 20 is greater than 1.1A and suddenly increases by 10%, such as would occur with a short 28. In either case, shutdown time is 50 μS maximum, and 15 μS typical.

The inrush current to lamps 26 is five times the steady-state current. Therefore, a provision is made for the controller 12 to "get through" the turn-on period without an over-current fault. A circuit within controller 12 slow starts the lamps 26 to keep peak current as low as possible and allows shorts 28 to appear as over-current before full power would be applied to the short. During the start-up period the peak allowable current is monitored to be 30A and remains so as long as the operator keeps his or her finger on the on/off pushbutton 14. After start-up, and after on/off button release, a sudden current increase of 10% or more will trip the controller 12 to interrupt the supply current to transformer 20.

An exemplary schematic circuit diagram of controller 12 is shown in FIG. 2. The 120/240 VAC line voltage present on AC line cord 16 is full-wave rectified by transformer 50 and diodes 52. A fuse 54 protects the controller 12 from internal circuit faults. Isolation diode 56 separates the filter capacitor 58 from a comparator 60. Several DC voltages are made available to the rest of the controller 12 circuitry. A voltage divider consisting of resistors 62 and 64 presents a rectified full-wave signal to the non-inverting input of comparator 60. Each time this full-wave signal exceeds +1.22V, the output of comparator 60 will swing to the positive rail. These swings will reverse bias diode 66 allowing a resistor 68 to charge a capacitor 70. When the voltage at the non-inverting input of comparator 60 falls below +1.22V, the output voltage will swing to the ground rail and diode 66 will forward bias, this in turn, will rapidly discharge capacitor 70. For 60 Hz AC line power, the capacitor 70 will charge/discharge at 120 Hz in phase with the line frequency. 35 The output voltage of comparator 60 is applied to the non-inverting input of a comparator 72. As long as non-inverting input of comparator 72 is more negative than the inverting input, the output of comparator 72 will remain near zero volts. As the AC line power passes through a wave peak (plus or minus) the non-inverting input of comparator 72 will have an R-C rise according to resistor 68 and capacitor 70. A FET 74 is controlled by comparator 72 through a resistor 76. The FET 74 is coupled to a bridge 78 such that the current on the primary winding of transformer 20 will pass through the FET 74 and a sensing resistor 80 when a relay 82 is closed.

Pressing pushbutton 14 will simultaneously set an R-S flip-flop 90A and reset R-S flip-flop 90B. The inverting input of comparator 72 will go to near zero and the output of comparator 72 will rise. An exclusive-or gate 94 will have a "1-0" on its inputs and therefore a "1" output to a three-in Nand gate 96. Exclusive-or gate 98 will have a "0-1" input, assuming "OFF" is high, and will have a "1" output to Nand gate 96. Assuming all inputs of Nand gate 100 to be high, its output will be low making the third input of Nand gate 96 low and the output high. The "1" at the output of flip-flop 90A will cause a comparator 102 to raise its output positive.

The loads of lamps 26 and shorts 28 will be reflected to the primary winding of transformer 20 and sensed by resistor 80. The voltage developed across resistor 80 is multiplied by a pair of op-amps 118A and 118B.

The pairing of bridge 78 and FET 74 constitute a very high speed AC power switch which is in series with, and therefore able to control, the lamps 26 by switching the current flowing in the primary winding of the transformer 20. When FET 74 is off, the primary winding gets no current. Resistor 80 supplies the primary current signal to the controller 12. All of the normal protective functions operate on the basis of current through resistor 80.

Certain circuits of the controller 12 are redundant so that no simple failure in the critical electronics will make the overall circuit fail in an unsafe way. Such redundant circuitry is labelled with identical numerals for corresponding elements, followed by a letter "A" or "B" to indicate the first and the second of the redundant sides. Therefore, while the following discussion treats only the first circuit, the second circuit behaves in a similar manner. A current through resistor 80 is amplified by op-amp 118A so that "VF1" is a voltage that represents the current through resistor 80. This voltage is applied to a pair of comparators 120A and 122A though a network of resistors 124A, 126A, and 128A. Resistors 124A and 126A form a voltage divider. Comparator 122A compares the instantaneous current of the lamps 26 with a fixed threshold (labelled +3.57A). FIG. 3 represents the voltage waveforms present on the inputs of comparator 122A. The comparison and switching mimics the operation of an extremely fast fixed fuse. When comparator 122A "sees" the current through resistor 80 exceeding the fixed threshold, it clears a flip-flop 90A, which in turn lowers the non-inverting input of a comparator 102. On the other side, when comparator 122B "sees" the current through resistor 80 exceeding the fixed threshold, it sets a flip-flop 90B, which in turn raises the inverting input of a comparator 72. Comparators 102 and 72 have their outputs "wire-anded" together, and when either of their outputs go low, the FET 74 will shut-off, interrupting the current to lamps 26. Whenever flip-flop 90B is in the "0" state, the system is enabled. Only by depressing switch 14 in the absence of circuit faults or shorts will the flip-flop 90B be in the "0" state. Flip-flop 90B is placed in the "1" state by any detected failure mode, or by any external short on the 12V lamp wire cables 22.

Comparator 120A compares the average current through resistor 80 with a fraction of the peak current through resistor 80. Resistor 128A and the capacitor at the non-inverting input of comparator 120A form a low pass filter that will average the current drawn through transformer 20. Referring now to FIG. 2, the comparator 120A will be tripped when the peak current through transformer 20, and therefore resistor 80, exceeds one lamp load plus one-and-a-half times the average current. Empirical observations show that a very fine #38 wire laid across cables 22 will trip controller 12 so fast that the fine wire does not fuse, break, or heat up.

A switch 136A modifies the thresholds during start up to "get through" the high current inrush phase. As long as the start button 14 is held down, switch 136A will be closed. The "floating" current limit is entirely disabled by switch 136A. A switch 138A changes the fixed fuse like limit to about three times the maximum average current. When switch 138A is closed, the controller 12 will nevertheless trip with a fine #32 wire placed across cables 22—but the very fine #38 wire will now fuse. The user is advised to make sure that the cables 22 are clear during start up. The protection level is deemed not so critical when a user is in attendance, as is indicated to controller 12 by the depressing of pushbutton 14.

The relay 82 is a safety circuit which interrupts the current to the 12V transformer 20 if any circuit failures are detected. When power comes on, the relay 82 is energized. If any of the following cases occur, the relay 82 is deenergized:
1. fuse 54 blows;
2. the flip-flops 90A and 90B are in disagreement (one indicates operate and the other indicates stay off);
3. if flip-flop 90B indicates do not operate and an opto-coupler 140 indicates that bridge 78 and FET 74 are short circuited or in operate mode.

The flip-flops 90A and 90B are placed in do-not-operate mode if thermistor 142 detects an over temperature on a power device heat sink (not shown) in thermal communication with FET 74.

A "slow start" function is implemented by comparator 72 in conjunction with a pair of resistors 144 and 146, a capacitor 148, and a diode 150. When flip-flop 90B output "Q" goes low, indicating "go on", diode 150 is reversed-biased and capacitor 148 takes about two seconds to discharge through resistors 144 and 146 to zero volts. During the discharge of capacitor 148, the non-inverting input of comparator 72 slowly drops from +Vcc to ground. This drop in voltage is constantly being compared with a sawtooth generated by comparator 60, diode 66, resistor 68, and capacitor 70, as shown in FIG. 4. Comparator 60 generates a sawtooth voltage by comparing a full-wave rectified line voltage from the transformer 50 secondary to a fixed threshold, as diagrammed in FIG. 5. Comparator 60 will thereby pulse width modulate the "on" signal to FET 74 and gradually increase the duty cycle to 100% at the end of the slow start period. The lamps 26 require less current using this method, making the overall current simpler to protect from shorts.

Faster responses to shorts appearing across cables 22 can be realized by taking advantage of the high frequency current components usually associated with a low resistance short making imperfect contact with a power source. The noise produced in such a situation is similar to "contact-bounce" found in relay applications. The high frequency noise associated with a developing short is given added emphasis by adding a capacitor 162A to op-amp 118A, and a capacitor 162B to op-amp 118B. At DC, the gain of op-amps 118A and 118B is ten, but at higher frequencies the gain can approach 100. This has the effect of ensuring even small shorts trip controller 12 and larger, heavier shorts trip controller 12 faster than usual.

An alternative embodiment of the present invention is shown in FIG. 6. An op-amp 200 and its associated circuitry are the only major differences between the schematics of FIG. 2 and FIG. 6. The schematic of FIG. 6 repeats the numbering of components found in the schematic of FIG. 2 for those components that have similar or identical functions. The operation of the embodiment in FIG. 6 is the same as is described above for the embodiment in FIG. 2, except for the following differences. The instantaneous current flowing in cables 22 is limited by comparing the current in them with a profile of the sinusoidal voltage waveform of the incoming power line. The instantaneous current in cables 22 will, in the absence of a short, closely parallel the voltage waveform present in the secondary winding of transformer 50. During the time between voltage peaks, and therefore current peaks, the current setpoint that will trip controller 12 can be dynamically reduced below the average value of the current used in the first embodiment described above. The waveforms in FIG. 7 represent the waveforms present on the inputs of comparator 122A, and are analogous to the waveforms of FIG. 3. Since op-amp 200 is configured as a voltage follower, a signal 202 at the output of op-amp 200 will follow the rectified full-wave sinusoidal voltage waveform present at the junction of resistors 62 and 64. Signal 202 will be in-phase with the current waveform that will be found in the primary winding of transformer 20. Since the current in the primary winding of transformer 20 passes through sensing resistor 80, a voltage waveform will be produced and then amplified by op-amps 118A and 118B. At the inverting input of comparator 122A, as is the case in the first embodiment, the voltage represents the current flowing through transformer 20 and cables 22. The non-inverting input to comparator 122A has a voltage that tracks the incoming line voltage.

Referring now to FIG. 7, a short 210 that occurs during the time between the current and voltage peaks is shown communicated to the inverting input of comparator 122A. The short 210 is not large enough in magnitude to exceed the average current trip setpoint in the first embodiment, but is large enough in this embodiment to cause controller 12 to trip, because short 210 will exceed the voltage at the non-inverting input of comparator 122A. The advantage of this embodiment is that shorts on cables 22 will be detected even in the low current valleys between the power line AC peak times. Earlier detection of a fault is therefore possible. This method is especially useful in bare wire systems, where response times well under a millisecond are necessary to limit the heating or sparking of a shorting object.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A incandescent light system over-current controller, comprising:
   a stepdown transformer having a primary winding and a plurality of incandescent lamps connected to a secondary winding;
   switching means for turning said incandescent lamps on and off by interrupting power in said primary winding of the stepdown transformer;
   monitoring means including a resistor-capacitor integrator network for sensing an average load on said secondary of the stepdown transformer from said primary winding of the stepdown transformer;
   means for comparing said average load on the stepdown transformer with an average line voltage and for determining a trip current value from said average load and said average line voltage;
   means for compensating said trip current value for an inrush current that occurs during a starting of said incandescent lamps and for limiting the current to said incandescent lamps by pulse width modulating current flowing in said primary of the stepdown transformer;
   means for detecting a sudden increase of current in said secondary winding of the stepdown transformer from said primary winding of the stepdown transformer; and
   protection means for instantaneously interrupting power supplied to said primary winding of the stepdown transformer responsive to said trip current value, the monitoring means and the sudden current increase detection means.

2. The system of claim 1, further including:
   means for amplifying high frequency components more than low frequency components of a developing short circuit, the means for amplifying in communication with the means for sensing the average load on said secondary winding of the stepdown transformer, and the means for amplifying in communication with the protection means.

3. The system of claim 1, wherein:
   the switching means includes a power FET and bridge combination in series with said primary winding of the stepdown transformer.

4. The system of claim 3, further comprising:
   a thermistor in thermal communication with said FET such that an over-temperature condition is preventable.

5. The system of claim 1, wherein:
   the monitoring means comprises a dropping resistor.

6. The system of claim 1, wherein:
   the means for comparing comprises an operational amplifier.

7. The system of claim 1, wherein:
   the means for compensating includes a resistor that switches to influence a voltage divider attached to an operational amplifier input.

8. The system of claim 1, wherein:
   the protection means includes a power FET and bridge combination in series with said primary winding of the stepdown transformer.

9. The system of claim 1, wherein:
   the means for detecting a sudden increase in said load includes a load sensing resistor coupled to the input to an operational amplifier sensitive to the voltage drop across said load sensing resistor.

10. A low-voltage incandescent lighting system over-current controller, comprising:

a stepdown transformer having a primary winding and a plurality of incandescent lamps connected to a secondary winding;

switching means for turning said incandescent lamps on and off by interrupting power in said primary winding of the stepdown transformer;

monitoring means including a resistor-capacitor differentiating network for sensing an instantaneous load on said secondary of the stepdown transformer from said primary winding of the stepdown transformer;

means for comparing said instantaneous load on the stepdown transformer with an average line voltage and for determining a trip current value from said average load and said average line voltage;

means for compensating said trip current value for an inrush current that occurs during a starting of said incandescent lamps and for limiting the current to said incandescent lamps by pulse width modulating said primary of the stepdown transformer;

means for detecting a sudden increase of current in said secondary of the stepdown transformer from said primary winding of the stepdown transformer; and protection means for instantaneously interrupting power supplied to said primary winding of the stepdown transformer responsive to said trip current value, the monitoring means and the sudden current increase detection means.

11. The system of claim 10, further including:

means for amplifying high frequency components more than low frequency components of a developing short circuit, the means for amplifying in communication with the monitoring means and with the protection means.

12. The system of claim 10, wherein:

the monitoring means includes a load sensing resistor and input to an operational amplifier in communication with voltage drop across said resistor.

13. The system of claim 10, wherein:

the monitoring means comprises a dropping resistor.

14. The system of claim 10, wherein:

the means for comparing comprises an operational amplifier.

15. The system of claim 10, whrein:

the means for compensating includes a resistor that switches in to adjust the dividing ratio of a voltage divider.

16. The system of claim 10, wherein:

the protection means includes a power FET and bridge combination in series with the primary winding of the stepdown transformer.

17. The system of claim 10, wherein:

the switching means includes a power FET and bridge combination in series with said primary winding of the stepdown transformer.

18. The system of claim 10, further comprising:

a thermistor in thermal communication with said FET such that an over-temperature condition is preventable.

19. A method of fast over-current protection for incandescent lighting systems, comprising the steps of:

pulse width modulating power in the primary of a stepdown transformer to a plurality of incandescent lamps connected to the secondary of said stepdown transformer during a high current inrush period;

sensing currents in said stepdown transformer secondary with a resistor in series with said stepdown transformer primary;

amplifying high frequencies more than low frequencies across said sensing resistor with a resistor-capacitor differentiating network;

splitting the sensed voltage according to frequencies between a plurality of redundant comparison stages;

comparing said sensed voltage in each redundant comparison stage with a respective setpoint;

tripping the current off to the incandescent lamps when said redundant comparison stages are not in agreement; and prohibiting current flow through said incandescent lamps when the user has indicated the incandescent lamps should be off via a switch means.

20. The method of claim 19, further comprising the step of:

detecting an over-temperature condition by means of a thermistor in thermal communication with a transistor used to control power in said stepdown transformer.

* * * * *